United States Patent
Smith et al.

(10) Patent No.: US 12,204,998 B2
(45) Date of Patent: Jan. 21, 2025

(54) QUANTUM SYSTEM AND METHOD OF MEASURING STATES OF QUBITS OF QUANTUM PROCESSOR

(71) Applicants: Samsung Electronics Co., Ltd., Suwon-si (KR); Imperial College Innovations Limited, London (GB)

(72) Inventors: Alistair Smith, London (GB); Myungshik Kim, London (GB); Chris Self, London (GB); Kiran Khosla, London (GB)

(73) Assignees: Samsung Electronics Co., Ltd., Suwon-si (KR); Imperial College Innovations Limited, London (GB)

( * ) Notice: Subject to any disclaimer, the term of this patent is extended or adjusted under 35 U.S.C. 154(b) by 383 days.

(21) Appl. No.: 17/667,797

(22) Filed: Feb. 9, 2022

(65) Prior Publication Data
US 2022/0269975 A1 Aug. 25, 2022

Related U.S. Application Data

(60) Provisional application No. 63/147,388, filed on Feb. 9, 2021.

(30) Foreign Application Priority Data

Dec. 23, 2021 (KR) .................. 10-2021-0186592

(51) Int. Cl.
*G06N 10/70* (2022.01)
(52) U.S. Cl.
CPC .................................. *G06N 10/70* (2022.01)

(58) Field of Classification Search
None
See application file for complete search history.

(56) References Cited

U.S. PATENT DOCUMENTS

| | | | |
|---|---|---|---|
| 7,554,080 B2 | 6/2009 | Munro et al. | |
| 10,223,643 B1 | 3/2019 | Bishop et al. | |
| 10,755,193 B2 | 8/2020 | Kandala et al. | |
| 11,334,693 B1 * | 5/2022 | Flammia | G06N 10/70 |

(Continued)

FOREIGN PATENT DOCUMENTS

| | | | |
|---|---|---|---|
| CA | 3135529 A1 * | 10/2020 | G06F 30/30 |
| WO | WO 2019/055843 A1 | 3/2019 | |

OTHER PUBLICATIONS

Smith, Alistair W.R., et al. "Qubit Measurement Error Mitigation with Bit-flip Averaging," *Imperial College* London SW7 2AZ, United Kingdom, 2021, (pp. 1-9).

(Continued)

*Primary Examiner* — Lina Cordero
(74) *Attorney, Agent, or Firm* — NSIP Law

(57) ABSTRACT

A method of measuring states of qubits of a quantum processor, the method includes providing, to the qubits, a control signal to control states of n qubits in the quantum processor, where n is a natural number; performing a bit-flip to invert a state of at least one qubit of the qubits; reading out output qubit values of bit-flipped qubits based on the performing of the bit-flip; and generating an error model indicating a probability of occurrence of measurement errors in the output qubit values based on a result of the reading-out of the output qubit values.

17 Claims, 13 Drawing Sheets

(56) References Cited

U.S. PATENT DOCUMENTS

2010/0251049 A1* 9/2010 Goto .................... H04L 9/0858
714/E11.032
2020/0175409 A1 6/2020 Kandala et al.
2020/0320425 A1 10/2020 Kelly
2021/0042650 A1 2/2021 Das et al.
2022/0269973 A1* 8/2022 Kelly .................... G06N 10/20

OTHER PUBLICATIONS

Tannu, Swamit S., et al. "Mitigating measurement errors in quantum computers by exploiting state-dependent bias." Proceedings of the 52nd Annual IEEE/ACM International Symposium on Microarchitecture. 2019., (12 pages in English).

Cramer, Julia, et al. "Repeated quantum error correction on a continuously encoded qubit by real-time feedback." Nature communications 7.1 (2016): 1-7.

Riste, Diego, et al. "Real-time decoding of stabilizer measurements in a bit-flip code." arXiv preprint arXiv:1911.12280 (2019)., (12 pages in English).

Funcke, Lena, et al. "Measurement error mitigation in quantum computers through classical bit-flip correction." Physical Review A 105.6, arXiv:2007.03663v3 [quant-ph] Sep. 1, 2022., (27 pages in English).

United Kingdom Office Action issued on Sep. 13, 2022, in counterpart United Kingdom Patent Application No. 2201635.6 (11 pages in English).

* cited by examiner

FIG. 7

$$M = \begin{pmatrix} p_{(00|00)} & p_{(00|01)} & p_{(00|10)} & p_{(00|11)} \\ p_{(01|00)} & p_{(01|01)} & p_{(01|10)} & p_{(01|11)} \\ p_{(10|00)} & p_{(10|01)} & p_{(10|10)} & p_{(10|11)} \\ p_{(11|00)} & p_{(11|01)} & p_{(11|10)} & p_{(11|11)} \end{pmatrix}$$

⇩

Input State

|  | $|00\rangle$ | $|01\rangle$ | $|10\rangle$ | $|11\rangle$ |
|---|---|---|---|---|
| $|00\rangle$ | 0.982 | 0.028 | 0.0317 | 0.0012 |
| $|01\rangle$ | 0.0116 | 0.9671 | 0.0005 | 0.031 |
| $|10\rangle$ | 0.0064 | 0.0002 | 0.9551 | 0.0286 |
| $|11\rangle$ | 0.0001 | 0.0047 | 0.0127 | 0.9392 |

Measured State

$$M = \begin{pmatrix} p(00|00) & p(00|01) & p(00|10) & p(00|11) \\ p(01|00) & p(01|01) & p(01|10) & p(01|11) \\ p(10|00) & p(10|01) & p(10|10) & p(10|11) \\ p(11|00) & p(11|01) & p(11|10) & p(11|11) \end{pmatrix} \longrightarrow \tilde{M} = \begin{pmatrix} \tilde{p}(00) & \tilde{p}(01) & \tilde{p}(10) & \tilde{p}(11) \\ \tilde{p}(01) & \tilde{p}(00) & \tilde{p}(11) & \tilde{p}(10) \\ \tilde{p}(10) & \tilde{p}(11) & \tilde{p}(00) & \tilde{p}(01) \\ \tilde{p}(11) & \tilde{p}(10) & \tilde{p}(01) & \tilde{p}(00) \end{pmatrix}$$

$$\tilde{M} = \begin{pmatrix} \tilde{p}(00) & \tilde{p}(01) & \tilde{p}(10) & \tilde{p}(11) \\ \tilde{p}(01) & \tilde{p}(00) & \tilde{p}(11) & \tilde{p}(10) \\ \tilde{p}(10) & \tilde{p}(11) & \tilde{p}(00) & \tilde{p}(01) \\ \tilde{p}(11) & \tilde{p}(10) & \tilde{p}(01) & \tilde{p}(00) \end{pmatrix}$$

QUANTUM SYSTEM AND METHOD OF MEASURING STATES OF QUBITS OF QUANTUM PROCESSOR

CROSS-REFERENCE TO RELATED APPLICATION

This application is based on and claims priority under 35 U.S.C. § 119 to Provisional U.S. Patent Application No. 63/147,388, filed on Feb. 9, 2021, in the U.S.P.T.O. and Korean Patent Application No. 10-2021-0186592, filed on Dec. 23, 2021, in the Korean Intellectual Property Office, the entire disclosures of which are incorporated by reference for all purposes.

BACKGROUND

1. Field

The disclosure relates to a quantum system and a method of measuring the states of qubits of a quantum processor.

2. Description of the Related Art

A quantum computer may be defined as a computational mechanical device that uses a quantum mechanical phenomenon such as quantum superposition or quantum entanglement as a principle of operation to perform data processing. A unit element, or the information itself, capable of storing information using the quantum mechanical principle, is referred to as a quantum bit or a qubit, which may be used as a basic unit of information in a quantum computer.

A bit used in a classical information storage device has a state of "0" or "1," whereas a qubit may simultaneously have states of "0" and "1" due to the superposition phenomenon. Furthermore, interactions between qubits may be achieved by the entanglement phenomenon. When N qubits are used, $2^N$ pieces of information may be created due to the characteristics of the qubits. Accordingly, by increasing the number of qubits, the amount and processing speed of information may be exponentially increased. However, there is a demand of a method capable of mitigating the measurement error of the states of qubits that is accompanied as the number of qubits increases.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of measuring states of qubits of a quantum processor, the method includes providing, to the qubits, a control signal to control states of n qubits in the quantum processor, where n is a natural number; performing a bit-flip to invert a state of at least one qubit of the qubits; reading out output qubit values of bit-flipped qubits based on the performing of the bit-flip; and generating an error model indicating a probability of occurrence of measurement errors in the output qubit values based on a result of the reading-out of the output qubit values.

The performing of the bit-flip may include inverting a measured state of at least one qubit randomly selected from among qubits set by the control signal.

The error model may include elements indicating a probability of the measurement errors with respect to each of $2^n$ output qubit values combinable with the n qubits.

The response matrix may include $2^n \times 2^n$ elements in which the $2^n$ elements are arranged to have symmetry.

The performing of the bit-flip may include acquiring an averaged probability of the measurement errors by removing an effect of error bias or quantum entanglement between the qubits.

The method may further include acquiring true qubit values of the qubits by correcting the output qubit values using the error model.

The reading-out of the output qubit values may include measuring a state corresponding to $|0\rangle$ or a state corresponding to $|1\rangle$ for each of the qubits.

The bit-flip may be performed using a Pauli-X gate.

A non-transitory computer-readable storage medium may store instructions that, when executed by one or more processors, configure the one or more processors to perform the method above.

In another general aspect, a quantum system includes a quantum processor having n qubits, where n is a natural number, and a quantum controller. The quantum controller is configured to provide, to the qubits, a control signal to control states of the n qubits in the quantum processor; perform a bit-flip to invert a state of at least one qubit of the qubits; read out output qubit values of bit-flipped qubits based on the perform of the bit-flip; and generate an error model indicating a probability of occurrence of measurement errors in the output qubit values based on a result of the read out of the output qubit values.

The quantum controller may be further configured to invert a measured state of at least one qubit randomly selected from among qubits set by the control signal.

The error model may include elements indicating a probability of the measurement errors with respect to each of $2^n$ output qubit values combinable with the n qubits.

The response matrix may include $2^n \times 2^n$ elements in which the $2^n$ elements are arranged to have symmetry.

The quantum controller may be further configured to perform the bit-flip to acquire an averaged probability of the measurement errors by removing an effect of error bias or quantum entanglement between the qubits.

The quantum controller may be further configured to acquire true qubit values of the qubits by correcting the output qubit values using the error model.

The quantum controller may be further configured to read out the output qubit values by measuring a state corresponding to $|0\rangle$ or a state corresponding $|1\rangle$ for each of the qubits.

The bit-flip may be performed using a Pauli-X gate.

In another general aspect, a quantum controller includes a quantum control circuit configured to control states of n qubits in a quantum processor and invert a state of one qubit of the qubits, where n is a natural number; a measurement circuit, connected to the quantum control circuit, configured to measure each qubit state by reading out output qubit values of the one qubit of the qubits inverted; and an error analyzer, connected to the quantum control circuit, configured to generate an error model indicating a probability of occurrence of measurement errors in the output qubit values based on a result of the reading out of the output qubit values.

The one qubit may be randomly selected from the qubits.

Other features and aspects will be apparent from the following detailed description, the drawings, and the claims.

BRIEF DESCRIPTION OF THE DRAWINGS

FIG. 7 illustrates an error model of a general method.

FIG. 9 illustrates a response matrix of an error model, according to an embodiment.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
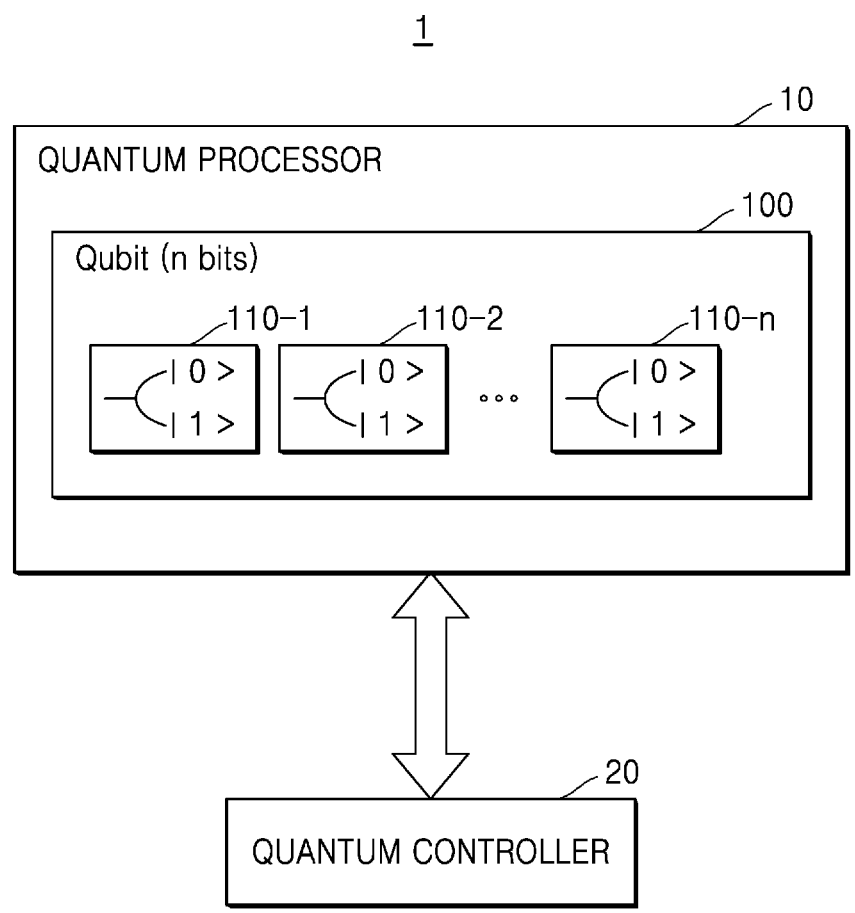
FIG. 1 is a block diagram of a quantum system according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a block diagram of a quantum system according to an embodiment.

Referring to FIG. 1, a quantum system 1 may include a quantum processor 10 and a quantum controller 20. The quantum processor 10 may include a multi-qubit 100 including a first qubit 110-1, a second qubit 110-2, . . . , and an n-th qubit 110-$n$, where n is a natural number.

The quantum system 1 is a computing system using the multi-qubit 100 as a unit element, or the information itself, capable of storing information using a quantum mechanical principle.

In detail, the quantum system 1 may be implemented by using various technologies capable of manipulating and measuring the quantum state of the multi-qubit 100. For example, the quantum system 1 may be implemented by using a quantum dot device (spin based and spatial based), a trapped-ion device, a superconductive quantum computer, optical lattices, a nuclear magnetic resonance computer, a solid-state NMR Kane quantum device, an electrons-on-helium quantum computer, a cavity quantum electrodynamics (CQED) device, a molecular magnet computer, a fullerene-based ESR quantum computer, and the like but the disclosure is not necessarily limited thereto.

In other words, the driving principle of the quantum system 1 of the present embodiment may be implemented by using the above-described examples, and a specific physical implementation using the multi-qubit 100 may be employed or changed by an appropriate method according to the driving principle employed in the quantum system 1.

The quantum system 1 may perform calculations using quantum mechanics phenomena such as superposition and entanglement. Unlike a classical digital computer for storing data as one of two distinct states of 0 or 1, the quantum calculation may be processed using the qubits (quantum bits) 110-1, 110-2, . . . , and 110-$n$ capable of superimposing states.

The qubits 110-1, 110-2, . . . , and 110-$n$ may be implemented using physically distinct quantum states of elementary particles such as electrons and photons. For example, the two states of the qubits 110-1, 110-2, . . . , and 110-$n$ using the polarization of photons may be distinguished as vertical polarization and horizontal polarization. Similarly, the two states of the qubits 110-1, 110-2, . . . , and 110-$n$ using the spin of electrons may be distinguished as up-spin and down-spin.

The two states of the qubits 110-1, 110-2, . . . , and 110-$n$ may be expressed as binary information such as $|0\rangle$ or $|1\rangle$ by using the Dirac notation. However, the qubits 110-1, 110-2, . . . , and 110-$n$ of the quantum system 1 may be simultaneously in superposition of two states, which may be the unique and basic characteristics of quantum computing. In other words, the two states of $|0\rangle$ or $|1\rangle$ may be simultaneously present, and in this state, the multi-qubit 100 may perform an operation in two states at once. Accordingly, then qubits 110-1, 110-2, . . . , and 110-$n$ may be capable of having $2^n$ binary expressions, and simultaneously perform $2^n$ operations through the superposition of $2^n$ states.

The multi-qubit 100 provided in the quantum processor 10 may be controlled in response to signals transmitted from the quantum controller 20. The quantum controller 20 may control qubit states by using a magnetic field source or an electric field source that is inductively or capacitively coupled to each of the qubits 110-1, 110-2, . . . , and 110-$n$.

For example, the quantum controller 20 may execute commands included in compiled quantum program codes for specifying a quantum runtime. The quantum program codes may be implemented as software executed on a processor of the quantum controller 20. Examples of the quantum program codes may be assigning operations according to an open quantum assembly language (QASM). However, the codes used in the quantum controller 20 are not limited to a specific language.

Figure 2:
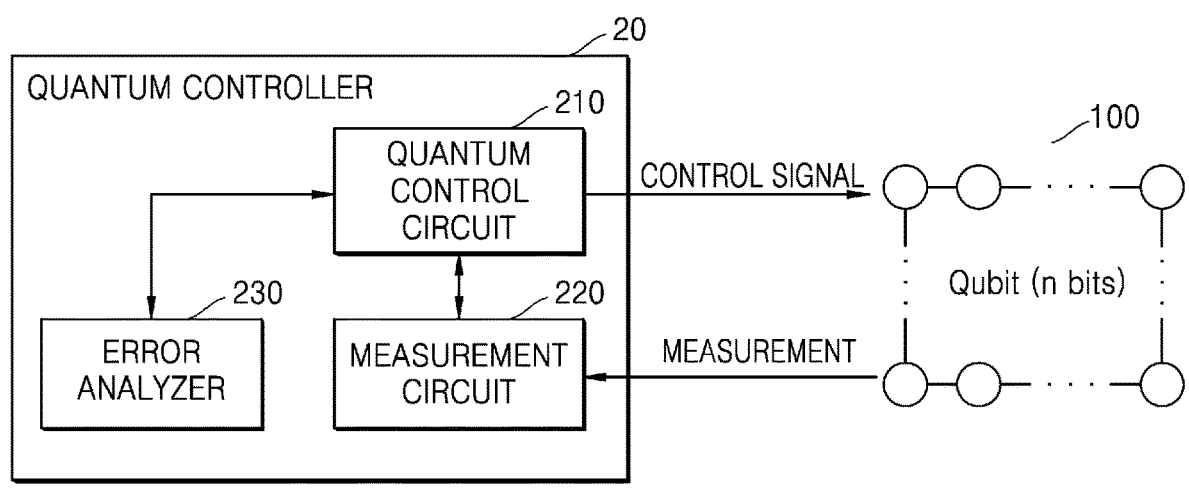
FIG. 2 is a block diagram showing a hardware configuration of a quantum controller according to an embodiment.

FIG. 2 is a block diagram showing a hardware configuration of a quantum controller according to an embodiment.

Referring to FIG. 2, the quantum controller 20 may include a quantum control circuit 210, a measurement circuit 220, an error analyzer 230, and an interface. In the quantum controller 20 of FIG. 2, hardware constituent elements related to an embodiment are illustrated for convenience of explanation. Accordingly, although not illustrated in FIG. 2, the quantum controller 20 may further include other hardware constituent elements, for example, a memory, for driving the quantum controller 20, or other general-purpose constituent elements.

The quantum control circuit 210 may include both a general-purposed or special-purposed processor for executing quantum program codes and a dedicated circuit for controlling the multi-qubit 100. One or more physical layer (PHY) devices for performing operation control on the multi-qubit 100 assigned by a quantum runtime may be coupled to or integrated with the quantum control circuit 210. For example, a physical layer device may include an electromagnetic transmitter for generating microwave pulses. Alternatively, the physical layer device may generate other electromagnetic signals to manipulate the multi-qubit 100 according to the quantum program code.

The quantum control circuit 210 may provide a control signal to control the qubit states of the multi-qubit 100 to the multi-qubit 100, and in response thereto, each qubit of the multi-qubit 100 may be controlled to have certain states.

Each qubit state of the multi-qubit 100 may be measured or read out by the measurement circuit 220. As described above, during measurement, each qubit may be measured to be in a state corresponding to $|0\rangle$ or a state corresponding to $|1\rangle$.

The error analyzer 230 may generate an error model for error correction considering a measurement error generated during the measurement of qubits. Noise, an example of such measurement error, is one of the major factors that may reduce the accuracy of quantum operation. Furthermore, due to the nature of quantum computing, a measurement error may be generated due to short qubit decoherence times and the like. In order to correct a measurement error such as a difference between a true qubit state and a measured qubit state, the error analyzer 230 may probabilistically analyze errors and generate an error model appropriate for the quantum system 1.

Figure 3:
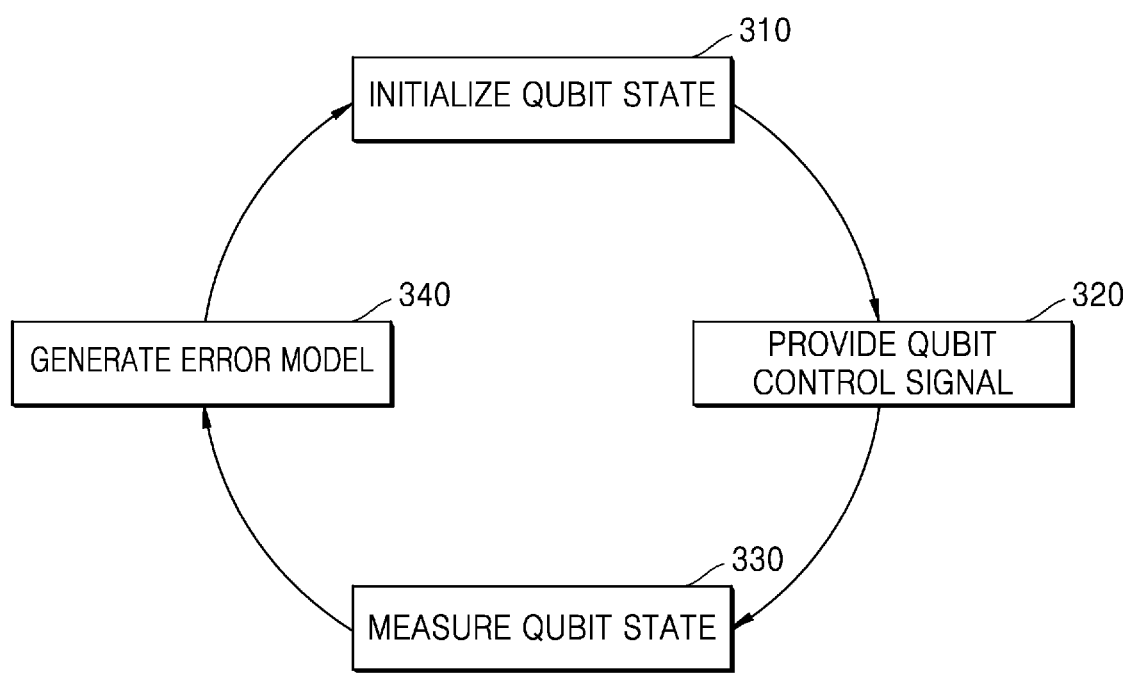
FIG. 3 is a block diagram showing the cycle of a measurement error correction of a quantum system according to an embodiment.

FIG. 3 is a block diagram showing the cycle of a measurement error correction of a quantum system according to an embodiment.

In operation 310, the initialization of a qubit state may be performed on the multi-qubit 100 provided in the quantum processor 10 under the control of the quantum controller 20. For example, each qubit may be initialized in a specific spin direction or initialized into an entangled state.

In operation 320, the quantum controller 20 provides the multi-qubit 100 with a qubit control signal to control the multi-qubit 100 in a certain state.

In operation 330, the quantum controller 20, for example, the measurement circuit 220, may measure each qubit state of the multi-qubit 100. In other words, the quantum controller 20 may read out output qubit values of the multi-qubit 100.

In operation 340, the quantum controller 20, for example, the error analyzer 230, generates an error model indicating a probability of a measurement error with respect to the output qubit value, based on a result of reading out the output qubit value.

A cycle from operations 310 to operation 340 may be repeatedly performed until an error model appropriate for the multi-qubit 100 is generated.

Figure 4:
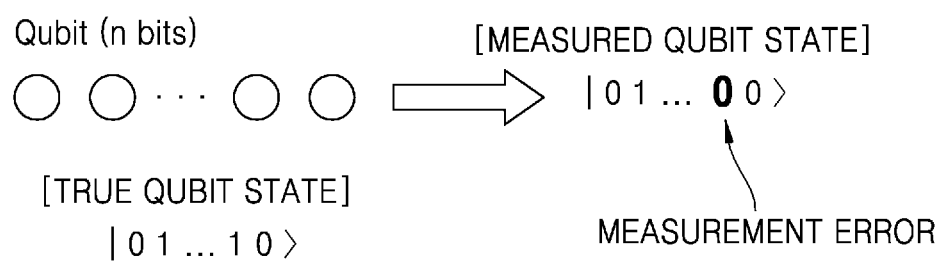
FIG. 4 illustrates a measurement error of qubits, according to an embodiment.

FIG. 4 illustrates a measurement error of qubits, according to an embodiment.

Referring to FIG. 4, even when a control signal to control the multi-qubit 100 having n qubits in a certain state, for example, a $|0\ 1\ \ldots\ 1\ 0\rangle$ state, is applied, due to a measurement error in a specific qubit, an output qubit state, for example, a |0 1 ... 0 0⟩ state, that is different from an input qubit state, may be measured. Such a measurement error may be generated due to entanglement among respective qubits, an error, that is, a read-out error, of a measurement device, or the like.

Although FIG. 4 illustrates an example of a measurement error in one qubit, the measurement error may be simultaneously generated in multiple qubits. As the number of qubits provided in the quantum processor 10 increases, a probability of occurrence of measurement errors also increases, and thus reliability of qubit operation may be reduced. Accordingly, there is a demand for reducing an error by correcting a measurement error of a qubit state.

Figure 5:
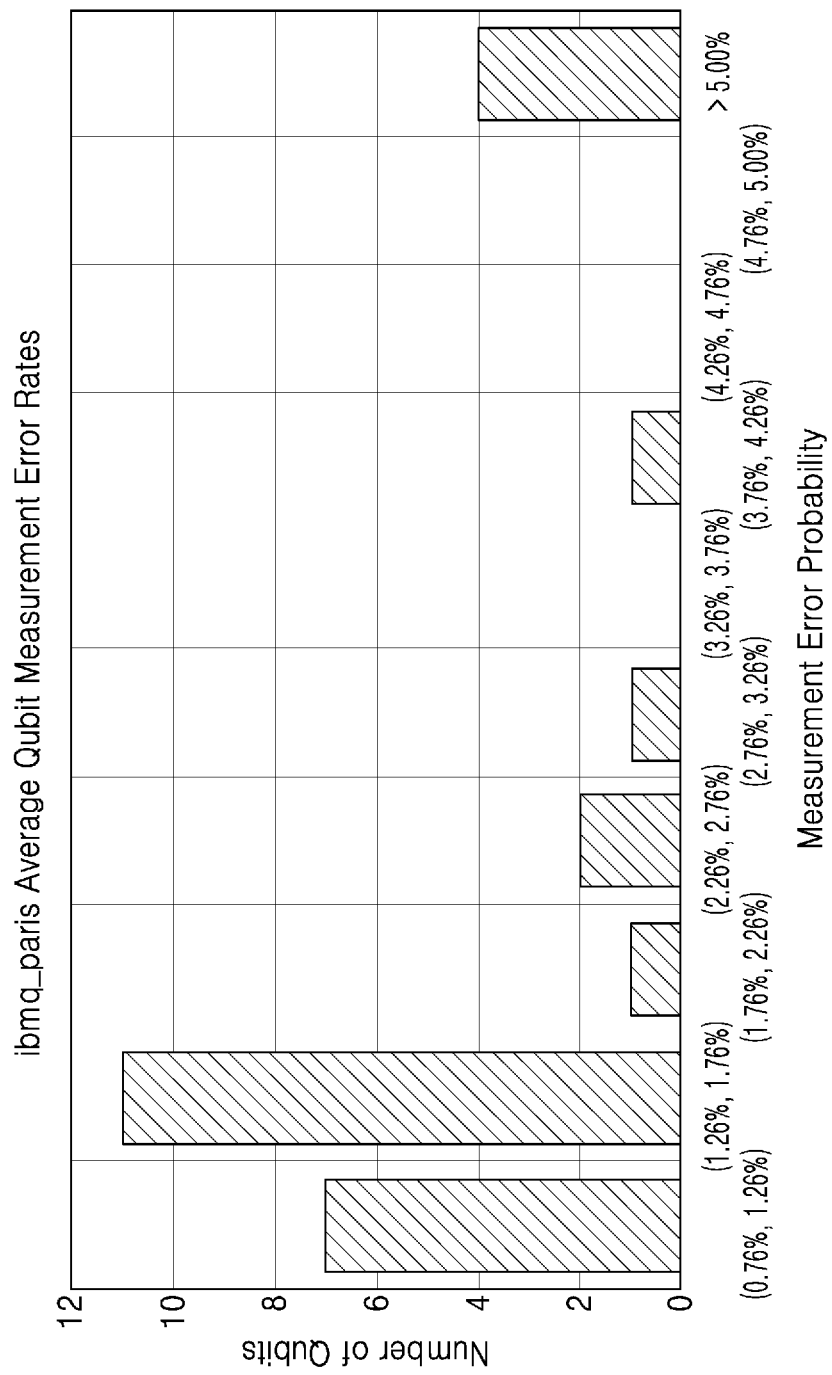
FIG. 5 is a graph showing a measurement error in a well-known quantum system.

FIG. 5 is a graph showing a measurement error in a well-known quantum system. For example, FIG. 5 shows the average qubit measurement error rates of the "ibmq_paris" quantum system. Referring to the graph, it may be seen that, in most cases, the probability of occurrence of measurement errors increases as the number of qubits increases.

Figure 6:
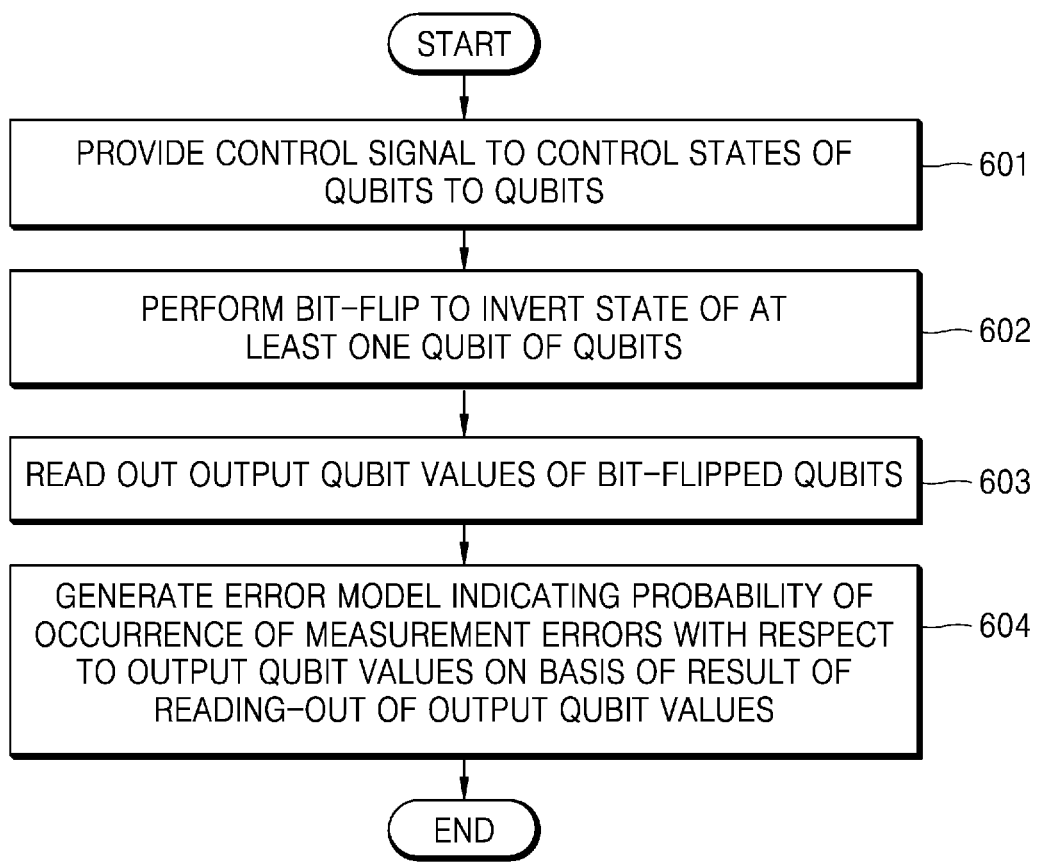
FIG. 6 is a flowchart of a method of measuring the states of qubits of a quantum processor, according to an embodiment.

FIG. 6 is a flowchart of a method of measuring the states of qubits of a quantum processor, according to an embodiment. As the method of FIG. 6 relates to operations processed in time series by the quantum system 1 of FIG. 1, any content described in relation to the quantum system 1, even omitted below, may be applied to the method of FIG. 6.

In operation 601, the quantum controller 20 provides a control signal to control the states of then qubits 110-1, 110-2, ..., and 110-$n$ provided in the quantum processor 10, to the qubits 110-1, 110-2, ..., and 110-$n$.

In operation 602, the quantum controller 20 performs a bit-flip to invert the state of at least one qubit of the qubits 110-1, 110-2, ..., and 110-$n$. In this state, the quantum controller 20 may invert a state measured with respect to at least one qubit that is randomly selected from among the qubits 110-1, 110-2, ..., and 110-$n$ set by the control signal. The above bit-flip scheme may be performed to acquire an averaged probability of measurement errors by removing effects of error bias or quantum entanglement among the qubits 110-1, 110-2, ..., and 110-$n$.

In operation 603, the quantum controller 20 reads out output qubit values of bit-flipped qubits. In other words, the quantum controller 20 may read out an output qubit value by measuring a state corresponding to |0⟩ or a state corresponding to |1⟩ with respect to each of the qubits 110-1, 110-2, ..., and 110-$n$.

In operation 604, the quantum controller 20 generates an error model indicating a probability of occurrence of measurement errors with respect to output qubit values, on the basis of a result of reading-out of the output qubit values. The error model is a response matrix including elements indicating a probability of a measurement error with respect to each of $2^n$ output qubit values that are combinable with n qubits, which is described in detail below.

FIG. 7 illustrates an error model of a general method.

Referring to FIG. 7, assuming a quantum system with two qubits, an error model according to a general method may be expressed as a response matrix M as in Equation 1 below.

$$M = \begin{pmatrix} p_{(00|00)} & p_{(00|01)} & p_{(00|10)} & p_{(00|11)} \\ p_{(01|00)} & p_{(01|01)} & p_{(01|10)} & p_{(01|11)} \\ p_{(10|00)} & p_{(10|01)} & p_{(10|10)} & p_{(10|11)} \\ p_{(11|00)} & p_{(11|01)} & p_{(11|10)} & p_{(11|11)} \end{pmatrix}$$ [Equation 1]

Each element $M_{i,j}$ of the response matrix may be expressed by a probability $p_{(i|j)}$. $p_{(i|j)}$ denotes a probability of reading out an input state |j⟩ of a qubit as |i⟩. For example, $p_{(10|01)}$ denotes a probability of reading out an input state of any qubit, which was |01⟩, as a measurement result of |10⟩.

As a result of generating a general error model in a certain system, a response matrix M having elements of probabilities as in Table 701 may be acquired. For example, according to Table 701, a probability $p_{(10|01)}$ of reading out an input state, which was |01⟩, as |10⟩ is 0.0002.

However, it is a problem that the error model of the response matrix M according to the related-art method acquires a probability with respect to the number of combinable cases with all qubits. In other words, when two qubits are provided, an error model may be generated only by calculating a probability with respect to the number of 16, that is, $4(=2^2) \times 4(=2^2)$, cases. Accordingly, as it may take a lot of time to calculate the probability for all combinations of qubit states, there is a problem that an error model may become inaccurate due to the characteristics of qubits, that is, the states of qubits are changeable over time, and a problem that more time is necessary to generate an error model as the number of qubits increases. For example, as the number of qubits increases, the number of probabilities $p_{(i|j)}$ to be calculated increases exponentially, and thus the efficiency of an error model according to a general method may be reduced.

Unlike the above, according to the present embodiment, as a method of generating an error model with only measurement of a single input state, the efficiency of generating an error model may be increased.

Figure 8A:
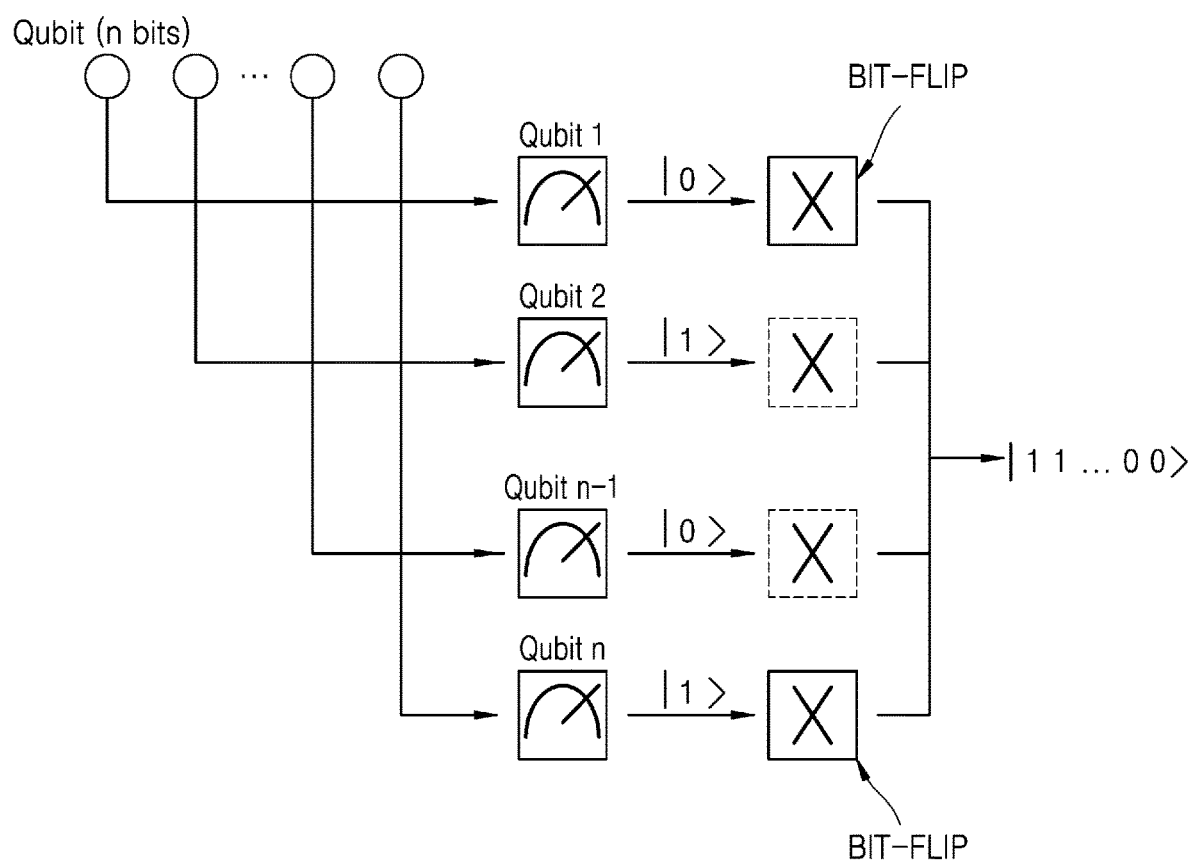
FIGS. 8A and 8B illustrate bit-flips performed on the measured qubit states, according to an embodiment.
Figure 8B:
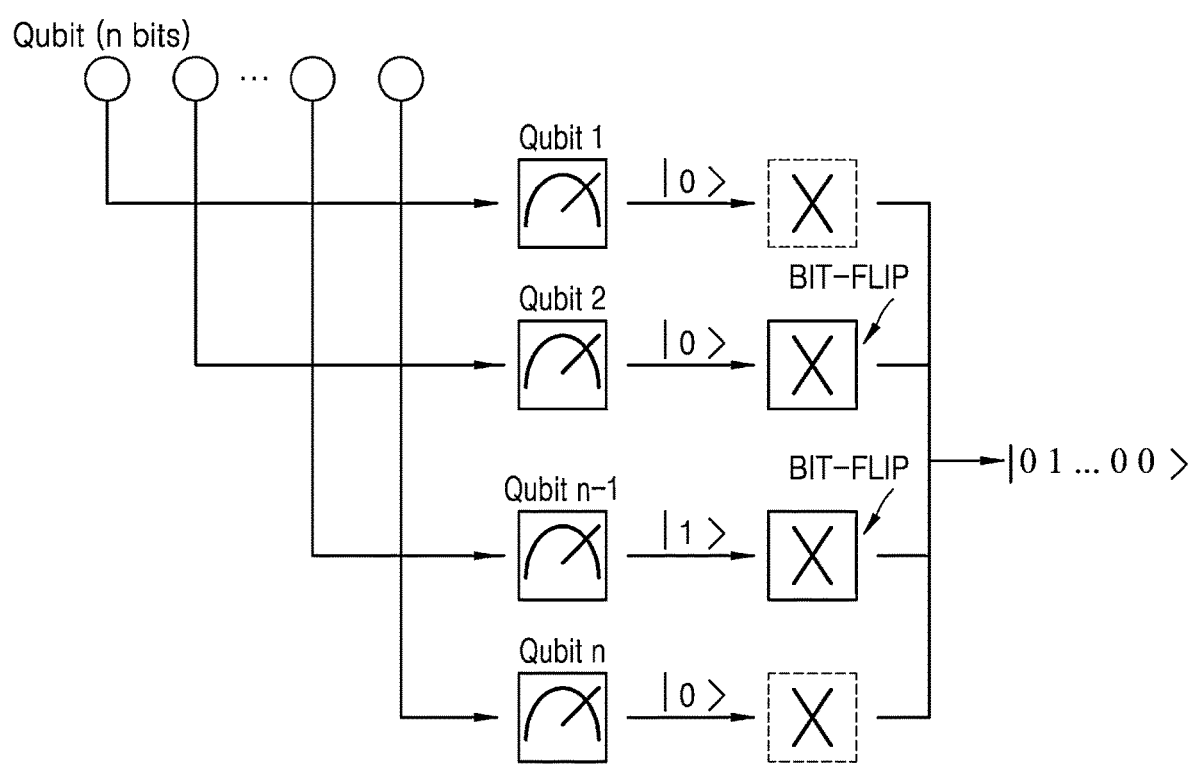

FIGS. 8A and 8B illustrate bit-flips performed on the measured qubit states, according to an embodiment.

Referring to FIGS. 8A and 8B, the quantum controller 20 may perform a bit-flip on a qubit state measured from at least one qubit of the entire n qubits. In this state, a qubit on which a bit-flip is to be performed may be randomly selected.

FIG. 8A illustrates an example in which "qubit 1" and "qubit n" of n qubits are selected to perform a bit-flip, and FIG. 8B illustrates an example in which "qubit 2" and "qubit n−1" of n qubits are selected to perform a bit-flip.

As such, when a bit-flip is arbitrarily performed on the measured qubit state, correlations by entanglement between qubits or error bias of qubit states are removed so that errors may be averaged.

For example, in the response matrix M of FIG. 7, $p_{(10|01)}$ =0.0002 and $p_{(10|11)}$=0.0286 are acquired as different probability values. This is due to a difference by a correlation between qubits such as qubit entanglement or error bias in a |01⟩ state and a |11⟩ state. Accordingly, as errors between qubits are averaged by performing a bit-flip through a random qubit selection, the generation of an error model may be simplified and streamlined.

The bit-flip of the present embodiment may be performed as Pauli-X operation using a Pauli-X gate, but the disclosure is not necessarily limited thereto.

The quantum controller 20 may generate an error model by repeatedly calculating a probability to be read out as an output qubit state that is different from an input qubit state, by repeatedly performing a bit-flip of randomly selected qubits during measurement on n qubits.

FIG. 9 illustrates a response matrix of an error model, according to an embodiment.

Referring to FIG. 9, assuming a quantum system with two qubits, the quantum controller 20, that is, the error analyzer 230, may generate an error model of a response matrix $\tilde{M}$ as shown in Equation 2, based on a result of reading-out of the output qubit values of bit-flipped qubits.

$$\tilde{M} = \begin{pmatrix} \tilde{p}_{(00|00)} & \tilde{p}_{(01|00)} & \tilde{p}_{(10|00)} & \tilde{p}_{(11|00)} \\ \tilde{p}_{(01|00)} & \tilde{p}_{(00|00)} & \tilde{p}_{(11|00)} & \tilde{p}_{(10|00)} \\ \tilde{p}_{(10|00)} & \tilde{p}_{(11|00)} & \tilde{p}_{(00|00)} & \tilde{p}_{(01|00)} \\ \tilde{p}_{(11|00)} & \tilde{p}_{(10|00)} & \tilde{p}_{(01|00)} & \tilde{p}_{(00|00)} \end{pmatrix} \quad \text{[Equation 2]}$$

$$= \begin{pmatrix} \tilde{p}_{(00)} & \tilde{p}_{(01)} & \tilde{p}_{(10)} & \tilde{p}_{(11)} \\ \tilde{p}_{(01)} & \tilde{p}_{(00)} & \tilde{p}_{(11)} & \tilde{p}_{(10)} \\ \tilde{p}_{(10)} & \tilde{p}_{(11)} & \tilde{p}_{(00)} & \tilde{p}_{(01)} \\ \tilde{p}_{(11)} & \tilde{p}_{(10)} & \tilde{p}_{(01)} & \tilde{p}_{(00)} \end{pmatrix}$$

According to Equation 2, $\tilde{P}(i)$ denotes a probability when a preset single input state is read out as $|i\rangle$ through a bit-flip. For example, when two qubits are read out as $|00\rangle$ in a preset input state through a bit-flip, $\tilde{P}(00)$ denotes a probability of being incorrectly measured as $|00\rangle$. Similarly, $\tilde{p}_{(01)}$, $\tilde{p}_{(10)}$, $\tilde{p}_{(11)}$ respectively denote probabilities of being incorrectly measured as $|01\rangle$, $|10\rangle$, and $|11\rangle$ through a bit-flip.

According to the present embodiment, the response matrix $\tilde{M}$ of an error model causes an artificial measurement error through a bit-flip, and thus effects such as entanglement or error bias are removed so as to average errors. Furthermore, without calculating the number of cases of all combinations of output qubit states corresponding to all combinations of input qubit states, a response matrix of an error model may be acquired by simply measuring output qubit states, that is, output qubit values. In other words, as illustrated in FIG. 9, according to an error model according to the present embodiment, as the response matrix $\tilde{M}$ may include $2^n \times 2^n$ elements in which $2^n$ elements, that is, $\tilde{p}_{(00)}$, $\tilde{p}_{(01)}$, $\tilde{p}_{(10)}$ and $\tilde{p}_{(11)}$, are arranged to have symmetry, an error model is efficiently generated within a faster time to perform error correction.

Although, in FIG. 9, an error model is generated on an assumption of two qubits, the response matrix $\tilde{M}$ of an error model that is generalized with respect to n qubits may be acquired with reference to Equations 3 and 4.

$$\tilde{M} = \sum_{s=0}^{2^n-1} \tilde{P}_{(s)} X^{(s)} \quad \text{[Equation 3]}$$

$$\tilde{P}_{(i)} = \frac{1}{2^n} \sum_{s=0}^{2^n-1} p_{(i \oplus s|s)} \quad \text{[Equation 4]}$$

Referring to Equations 3 and 4, s denotes a decimal value of a measured qubit state, that is, an output qubit state, and $X^{(s)}$ denotes a Pauli-X operation, that is, a bit-flip, by a Pauli-X gate.

When performing a qubit operation, the quantum controller 20 corrects an output qubit value (or output qubit state) by using an error model such as the response matrix $\tilde{M}$, thereby acquiring a true qubit value (or true qubit state) of qubits. For example, as a measured qubit value $p_{obs}$ is corrected by using Equation 5 below, a true qubit value $p_{true}$ may be acquired.

$$p_{obs} = M p_{true} \quad \text{[Equation 5]}$$

$$p_{true} = M^{-1} p_{obs}$$

$$p^* \leftarrow \arg \min_{p} (p_{obs} - Mp)^2$$

$$\text{subject to} \quad \sum_i p_i = 1, \; p_i \leq 0 \, \forall \, p_i$$

As such, as the quantum system 1, according to the present embodiment, performs error correction by generating a response matrix of an error model $\tilde{M}$ within a relatively fast time through the measurement of a bit-flipped qubit value, even when the number of qubits increases, the processing speed, and performance of a qubit operation may be efficiently improved.

Figure 10:
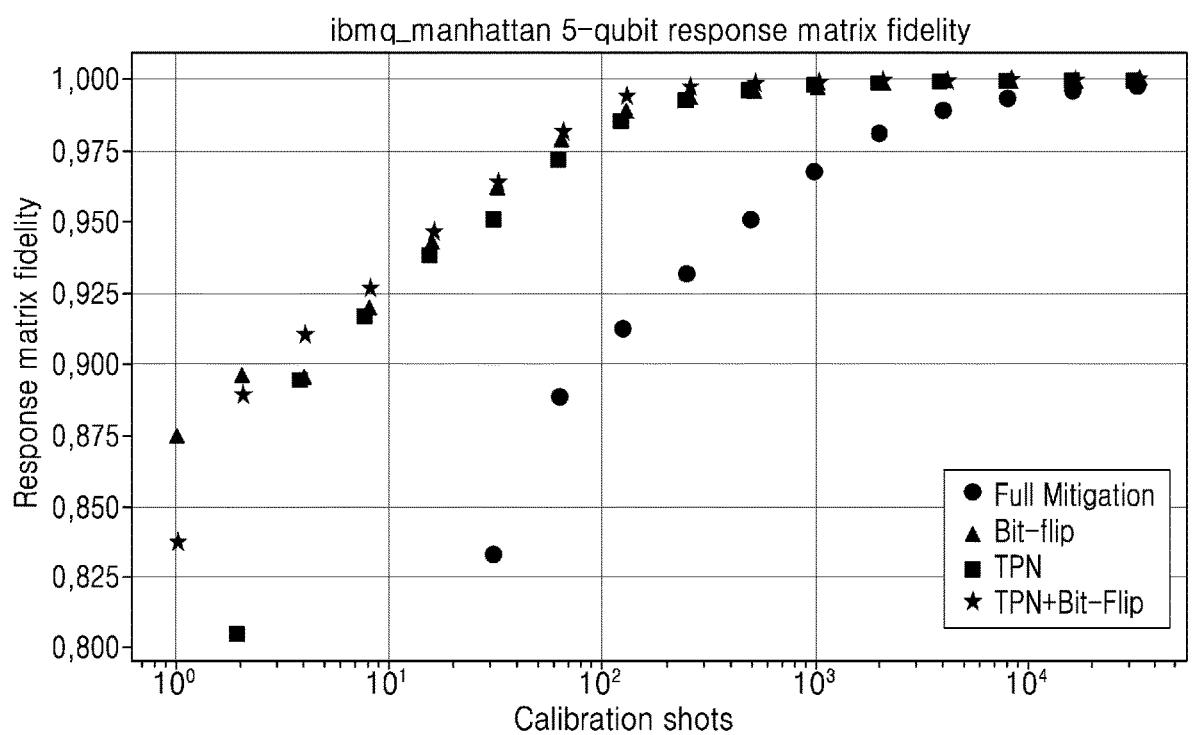
FIG. 10 is a graph showing a simulation result of comparing the response matrix fidelity between a scheme using a bit-flip and a scheme according to the related art.

FIG. 10 is a graph showing a simulation result of comparing the response matrix fidelity between a scheme using a bit-flip and a scheme according to the related art.

The simulation data of FIG. 10 is data about quantum measurement error reduction using a scheme according to the related art such as full mitigation or a tensor product noise model (TPN) and a scheme according to the present embodiment using a bit-flip such as bit-flip or TPN+bit-flip. The horizontal axis of data shows the number of measurements, and the vertical axis shows the fidelity of a measured response matrix. The closer the fidelity of the matrix to 1, the more the measurement error is removed. The data of FIG. 10 is a result of measurement in a quantum system with five qubits. For each calibration shot, it is necessary to measure 32 (=25) states for full-mitigation, one qubit state of |00000 ) for bit-flip, and two-qubit states of |00000) and | 11111 ) for TPN. As bit-flip and TPN+bit-flip need only one time of measurement, as described in data of FIG. 10, it may be seen that the fidelity of a matrix in the scheme according to the present embodiment using a bit-flip converges to 1 faster than the scheme according to the related arts.

Figure 11:
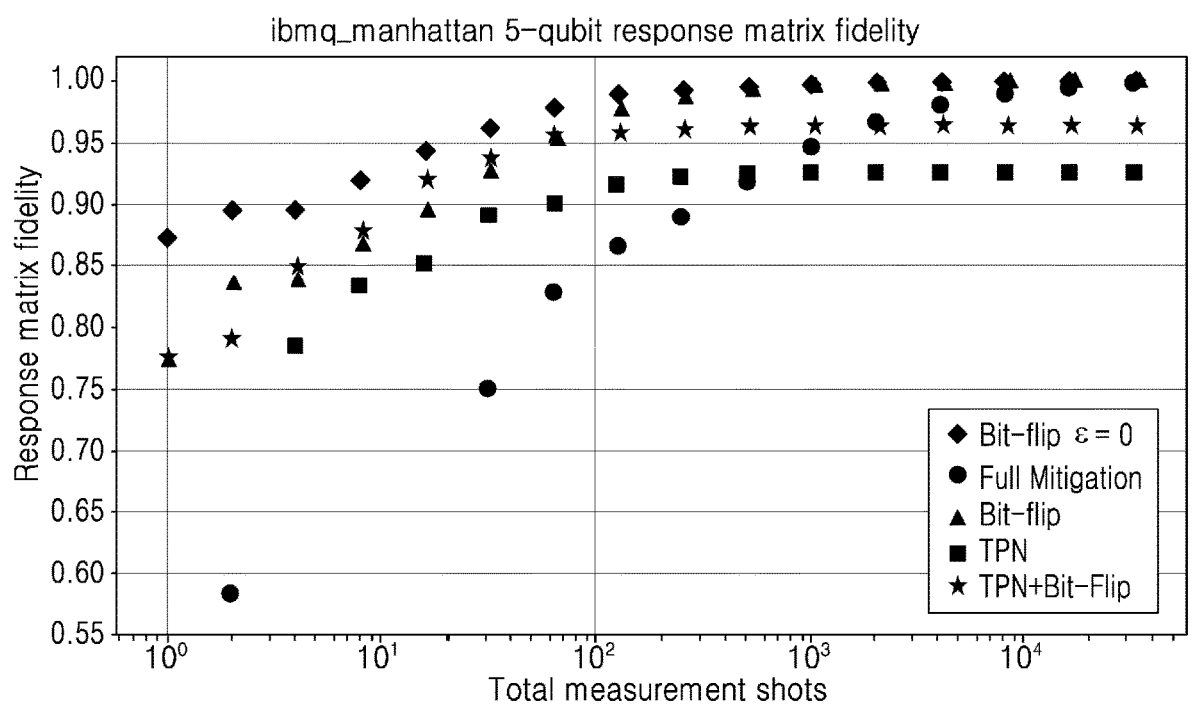
FIG. 11 is a graph showing a simulation result of comparing the response matrix fidelity between a scheme using a bit-flip and a scheme according to the related art.

FIG. 11 is a graph showing a simulation result of comparing the response matrix fidelity between the scheme using a bit-flip and the scheme according to the related art.

The simulation data of FIG. 11 is data obtained by performing a simulation of FIG. 10 after increasing a specific error in an existing response matrix to recognize the effect on a correlated error by the entanglement between qubits ($\varepsilon \rangle$ 0). For the simulation of FIG. 11, a complex model is necessary to calculate an existing response matrix due to the increased error. It may be seen that, in the scheme according to the present embodiment using a bit-flip, even when the correlated error increases, the fidelity of a matrix approaches 1, whereas the scheme according to the related art using TPN may not be so.

Figure 12:
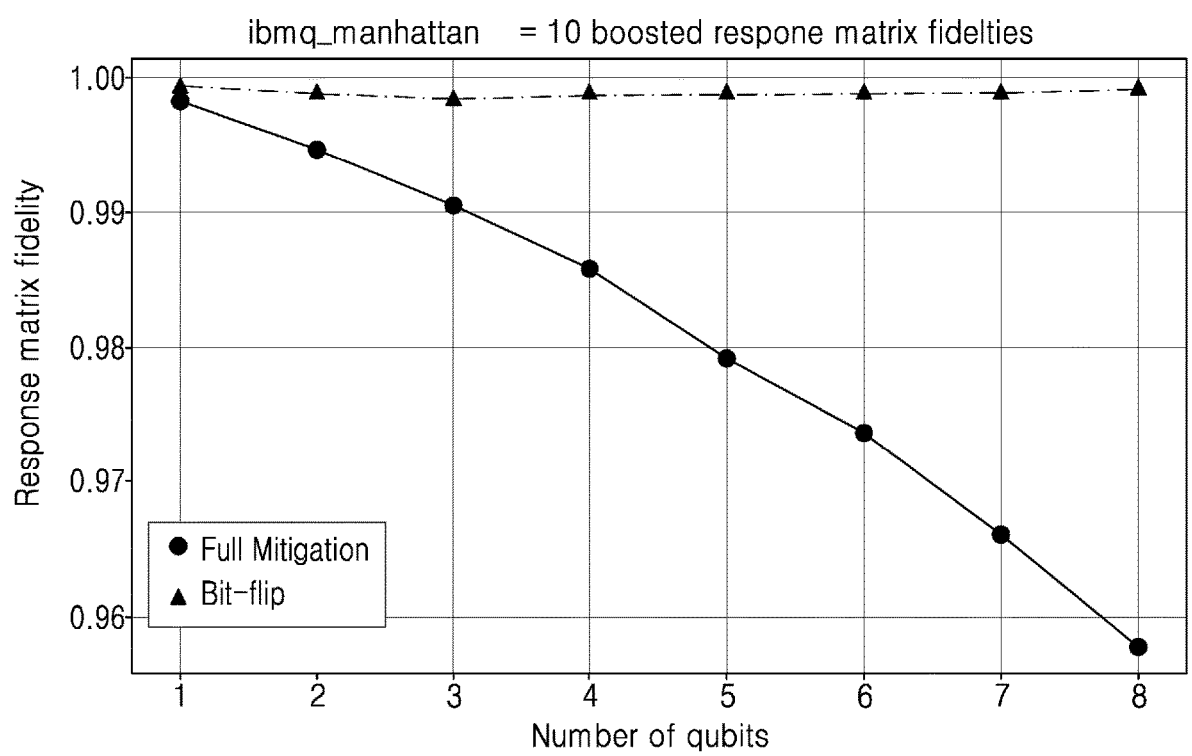
FIG. 12 is a graph showing how the response matrix fidelity increases according to the number of measures qubits.

FIG. 12 is a graph showing how the response matrix fidelity increases according to the number of measures qubits. FIG. 12 shows a simulation result under the conditions of using a measured response matrix in ibmq_manhattan, and increasing the correlated error to 10 ($\varepsilon$=10). The total number of measurements is fixed to $2^n * 100$ (n is the number of qubits). In the scheme (full mitigation) according to the related art, all elements in each column of a response matrix are obtained, and thus, it may be seen that fidelity is reduced because the number of measurements assigned to each column is exponentially decreased with respect to the number of qubits.

Referring to the simulation results described with reference to FIGS. 10 to 12, compared with the scheme according to the related arts (full mitigation or TPN), in the scheme using a bit-flip according to the present embodiment, as the response fidelity of a matrix converges to 1 within a relatively fast time under any condition, the scheme using a bit-flip according to the present embodiment may be applied to the efficient correction of a measurement error.

The embodiments described above are merely examples, and do not limit the technical scope by any method. For brevity of the specification, descriptions of well-known electronic components, control systems, software, and other functional aspects have been omitted. Furthermore, the connection of lines or connection members between the constituent elements shown in the drawings exemplarily show functional connection and/or physical or circuit connections, and in real devices, may be implemented as replaceable or additional various functional connections, physical connections, or circuit connections.

The quantum system 1, quantum processor 10, quantum controller 20, multi-qubit 100, quantum control circuit 210, measurement circuit 220, error analyzer 230, and interface in FIGS. 1-4, 6, and 8A-12 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-4, 6, and 8A-12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of measuring states of qubits of a quantum processor, the method comprising:
   providing, to the qubits, a control signal to control states of n qubits in the quantum processor, where n is a natural number;
   performing a bit-flip to invert a state of at least one qubit of the n qubits;
   reading out output qubit values of bit-flipped qubits based on the performing of the bit-flip;
   generating an error model indicating a probability of occurrence of measurement errors in the output qubit values based on a result of the reading-out of the output qubit values; and
   acquiring true qubit values of the n qubits by correcting the output qubit values using the error model.

2. The method of claim 1, wherein the performing of the bit-flip comprises inverting a measured state of the at least one qubit, the at least one qubit randomly selected from among the n qubits in order to provide appropriate antecedence basis.

3. The method of claim 2, wherein a response matrix comprises $2^n \times 2^n$ elements in which the $2^n$ elements are arranged to have symmetry.

4. The method of claim 1, wherein the error model comprises elements indicating the probability of the measurement errors with respect to each of $2^n$ output qubit values combinable with the n qubits in order to provide appropriate antecedence basis.

5. The method of claim 1, wherein the performing of the bit-flip comprises acquiring an averaged probability of the measurement errors by removing an effect of error bias or quantum entanglement between the qubits.

6. The method of claim 1, wherein the reading-out of the output qubit values comprises measuring a state corresponding to |0⟩ or a state corresponding to |1⟩ for each of the qubits.

7. The method of claim 1, wherein the bit-flip is performed using a Pauli-X gate.

8. A non-transitory computer-readable storage medium storing instructions that, when executed by one or more processors, configure the one or more processors to perform the method of claim 1.

9. A quantum system comprising:
   a quantum processor having n qubits, where n is a natural number; and
   a quantum controller configured to:
   provide, to the n qubits, a control signal to control states of the n qubits in the quantum processor;
   perform a bit-flip to invert a state of at least one qubit of the n qubits;
   read out output qubit values of bit-flipped qubits based on the perform of the bit-flip;
   generate an error model indicating a probability of occurrence of measurement errors in the output qubit values based on a result of the read out of the output qubit values; and
   acquiring true qubit values of the n qubits by correcting the output qubit values using the error model.

10. The quantum system of claim 9, wherein the quantum controller is further configured to invert a measured state of the at least one qubit, the at least one qubit randomly selected from among the n qubits in order to provide appropriate antecedence basis.

11. The quantum system of claim 9, wherein the error model comprises elements indicating the probability of the measurement errors with respect to each of $2^n$ output qubit values combinable with the n qubits in order to provide appropriate antecedence basis.

12. The quantum system of claim 11, wherein a response matrix comprises $2^n \times 2^n$ elements in which the $2^n$ elements are arranged to have symmetry.

13. The quantum system of claim 9, wherein the quantum controller is further configured to perform the bit-flip to acquire an averaged probability of the measurement errors by removing an effect of error bias or quantum entanglement between the n qubits.

14. The quantum system of claim 9, wherein the quantum controller is further configured to read out the output qubit values by measuring a state corresponding to |0⟩ or a state corresponding to |1⟩ for each of the n qubits.

15. The quantum system of claim 9, wherein the bit-flip is performed using a Pauli-X gate.

16. A quantum controller, comprising:
   a quantum control circuit configured to control states of n qubits in a quantum processor and invert a state of one qubit of the n qubits, where n is a natural number;
   a measurement circuit, connected to the quantum control circuit, configured to measure each qubit state by reading out output qubit values of the one qubit of the n qubits inverted;
   an error analyzer, connected to the quantum control circuit, configured to generate an error model indicating a probability of occurrence of measurement errors in the output qubit values based on a result of the reading out of the output qubit values; and
   acquiring true qubit values of the n qubits by correcting the output qubit values using the error model.

17. The quantum controller of claim 16, wherein the one qubit is randomly selected from the n qubits.

* * * * *